United States Patent Office 2,999,888

Patented Sept. 12, 1961

1

2,999,888

PRODUCTION OF CHLOROPRENE

Henry Peter Crocker, Hornsea, East Yorkshire, and Karl Heinrich Walter Turck, Banstead, England, assignors to The Distillers Company Limited, Edinburgh, Scotland, a British company No Drawing. Filed June 23, 1959, Ser. No. 822,183
Claims priority, application Great Britain July 4, 1958
5 Claims. (Cl. 260—655)

The present invention relates to the production of halobutadienes, and in particular to the production of chloroprene by the dehydrochlorination of 3:4-dichlor-butene-1.

The preparation of chloroprene, or 2-chlorobutadiene by the dehydrochlorination of 3:4-dichlorbutene-1 has already been proposed. In one method 3:4-dichlorbutene-1 is treated with an aqueous alkali metal hydroxide solution at a temperature at least equal to the boiling temperature of chloroprene, and the chloroprene is distilled off from the reaction mixture substantially as soon as it is formed. It is advantageous to distil off the chloroprene through a rectifying column so that unchanged dichlorobutene is returned to the reactor. In this process, no corrosion of metals such as stainless steel is noted in that part of the reactor which is covered by the alkaline liquid phase but severe corrosion occurs above the liquid level and in the lower part of the column. This is because some hydrolysis of 3:4-dichlorobutene occurs giving highly corrosive free hydrochloric acid, and corrosion is not readily suppressed by feeding alkali solution down the column.

According to the present invention, the process for the production of chloroprene comprises treating 3:4-dichlorobutene-1 with an aqueous alkali metal hydroxide solution at a temperature in the range of 70°–130° C., and at a pressure sufficient to maintain the reaction mixture in the liquid phase, separating from the reaction mixture an oil phase containing chloroprene and unreacted dichlorbutene and distilling the oil phase to recover the chloroprene therefrom.

The process of the present invention has the advantage that the chloroprene and dichlorbutene are removed from the reaction mixture in the liquid phase substantially free from water, and accordingly there is substantially no hydrolysis of the dichlorbutene to produce hydrochloric acid.

Any alkali metal hydroxide may be used in the process of the present invention, for instance sodium or potassium hydroxide. The concentration of the alkali metal hydroxide solution may vary within moderately wide limits, for instance between about 1% and about 30% by weight. It is preferred to use a concentration between about 5% and about 20% by weight.

The reaction is carried out at a temperature in the range of 70° to 130° C. at pressures sufficient to maintain the reaction mixture in the liquid phase. At temperatures below 70° C. the reaction takes place too slowly to be of economic interest, while at temperatures appreciably higher than 130° C. the chloroprene polymerises rapidly. At 80° C. a pressure of about 15 p.s.i.g. is needed to maintain the reaction mixture in the liquid phase, and at 130° C. the pressure required is about 75 p.s.i.g. It is preferred to operate at temperatures between 80° and 100° C. and at pressures of about 25 to 50 p.s.i.g.

The reaction may be carried out in any suitable manner, and both batchwise and continuous operation are possible. It is preferred to operate the process continuously. In one method of operation the reaction zone comprises an agitated vessel heated to the required reaction temperature, into which the reactants are fed and which is maintained at the required pressure by means of an inert gas such as nitrogen. The liquid reactants are continuously removed, cooled, and passed to a phase-separator in which the upper oil phase containing chloroprene and unreacted dichlorbutene is separated from the aqueous alkali phase. The oil phase is subsequently subjected to distillation to recover the chloroprene as an overhead fraction leaving unreacted dichlorbutene as the residue. The dichlorbutene is preferably recycled to the dehydrochlorination reactor.

The process of the present invention is further illustrated with reference to the following example.

*Example 1*

287.3 grams of 3:4-dichlorbutene-1 and 2285 mls. of sodium hydroxide solution containing 114 grams sodium hydroxide were charged, together with a polymerisation inhibitor, to a stainless steel reactor which was heated at 85° to 92° for 20 minutes and at 87° to 95° for 20 minutes at a pressure of 20 p.s.i.g., which maintained the reactants in the liquid phase. The reaction mixture was then cooled and the oil phase containing chloroprene and a small amount of unreacted dichlorbutene was separated and subjected to distillation to recover the chloroprene therefrom. The conversion of dichlorbutene was 82%, and of the dichlorbutene which reacted 93.5% was converted to chloroprene. Negligible corrosion was observed in the apparatus.

*Example 2*

Aqueous sodium hydroxide (2.4 N, one litre/hr.) and 3:4 dichlorobutene-1 (281 gms./hr.) were fed continuously to a stirred stainless steel reactor operated at 85–95° C. and 25 p.s.i.g., together with suitable polymerisation inhibitors. The residence time of the reactants based on the working volume of the vessel was 1.7 hours. The reaction mixture was withdrawn from the reactor, cooled and separated continuously into an aqueous and an oil phase. 86% of the dichlorobutene fed was converted at an efficiency to chloroprene of 94% and to 1-chlorobutadiene of 2.3%.

We claim:

1. The process for the production of chloroprene which comprises treating 3:4-dichlorbutene-1 with an aqueous alkali metal hydroxide solution at a temperature in the range of 70° to 130° C., and at a pressure sufficient to maintain the reaction mixture in the liquid phase, separating from the reaction mixture an oil phase containing chloroprene and unreacted dichlorbutene and distilling the oil phase to recover the chloroprene therefrom.

2. The process as claimed in claim 1 wherein the alkali metal hydroxide is sodium hydroxide.

3. The process as claimed in claim 1 wherein the concentration of alkali metal hydroxide in the reaction mixture is between about 5 and 20% by weight.

4. The process as claimed in claim 1 wherein the reaction mixture is maintained at a temperature between 80° and 100° C., and at a pressure of about 25 to 50 p.s.i.g.

5. A process which comprises heating 3:4-dichlorbutene-1 in an aqueous alkali metal hydroxide bath at a temperature and pressure to maintain the reaction mass in the liquid phase, and removing impure substantially water-free chloroprene from the bath.

References Cited in the file of this patent

UNITED STATES PATENTS

| | | |
|---|---|---|
| 2,038,538 | Carothers | Apr. 28, 1936 |
| 2,430,016 | Hearne et al. | Nov. 4, 1947 |